Dec. 22, 1942.　　　H. L. FUSTON　　　2,305,858
SPEED CONTROLLING MECHANISM
Filed Feb. 17, 1941　　　2 Sheets-Sheet 1
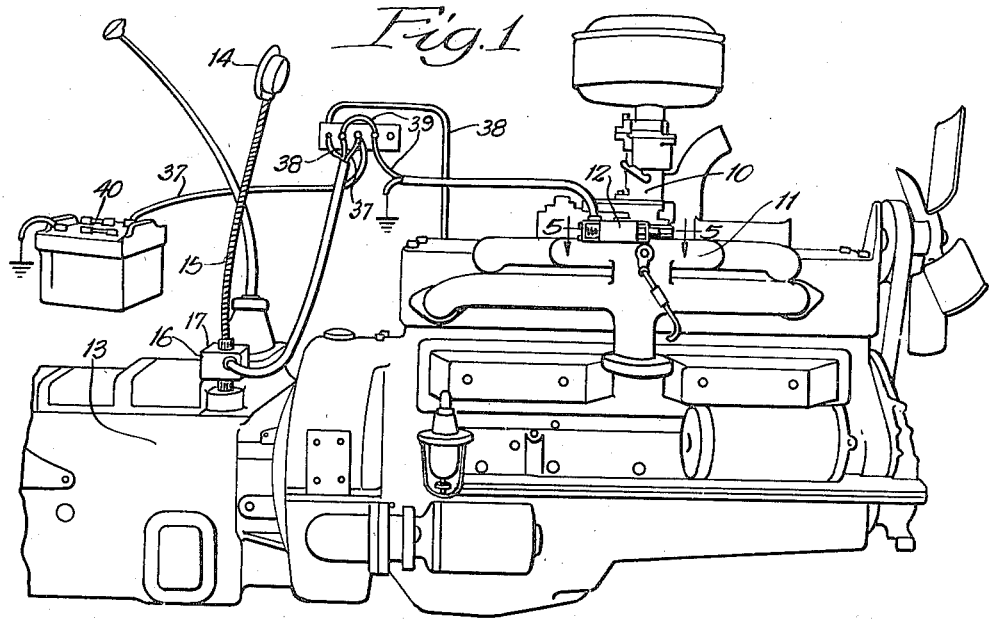
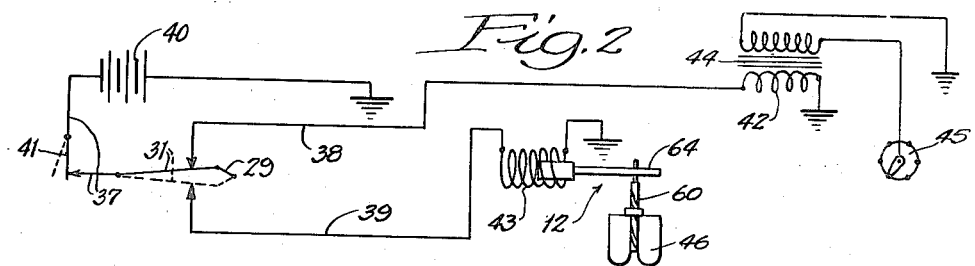
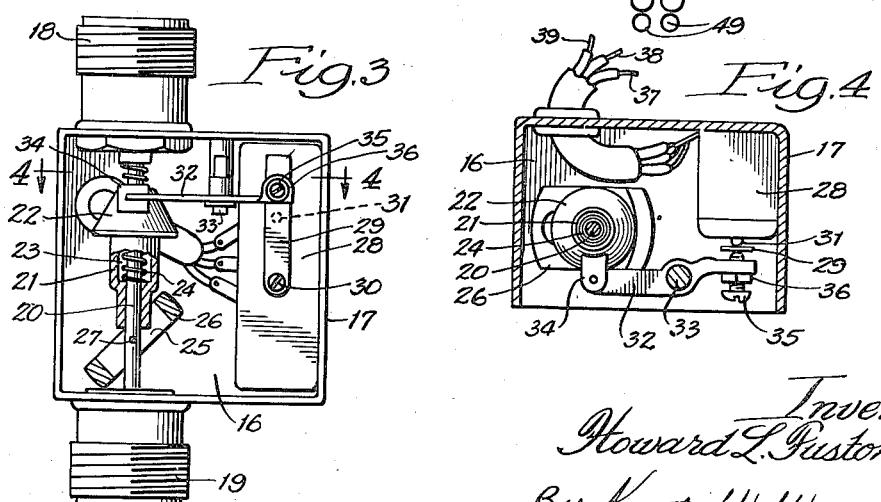

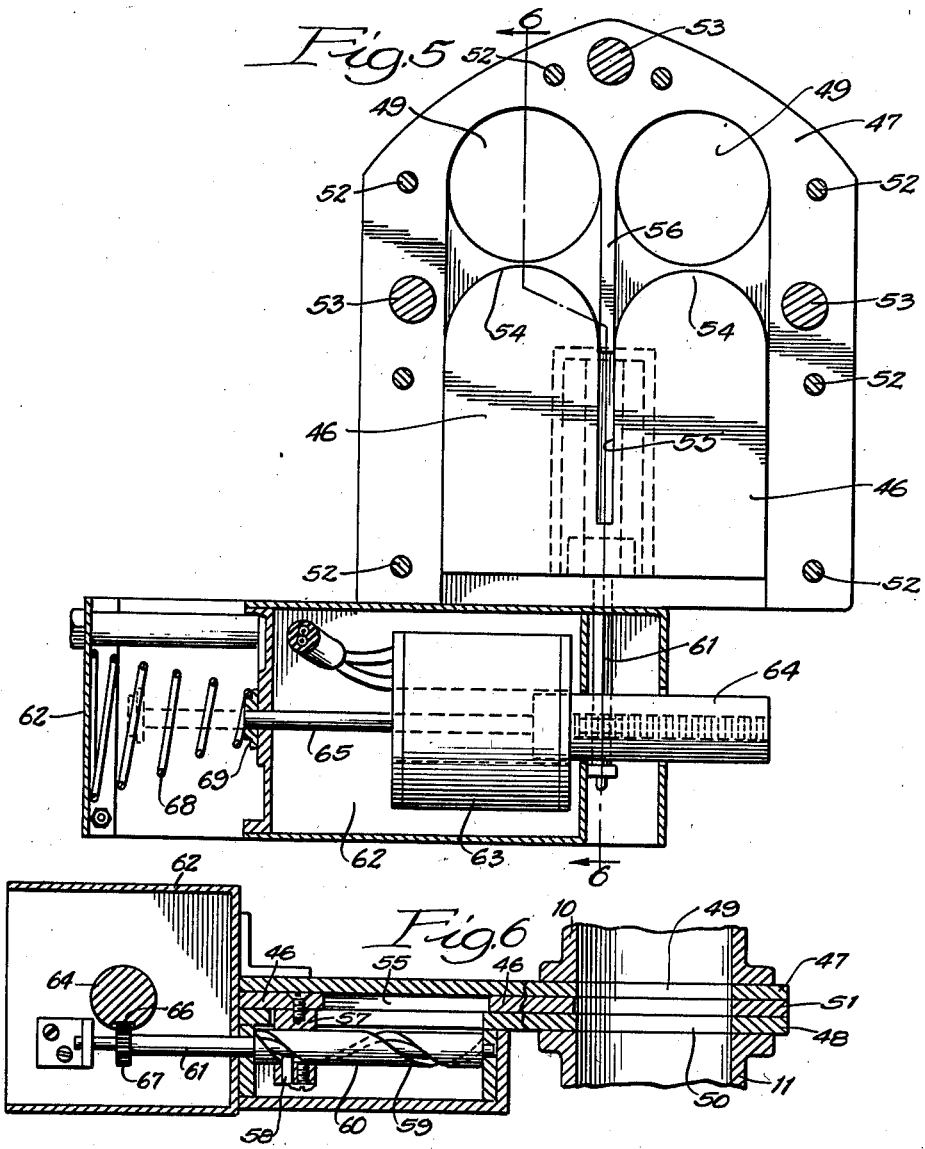

Patented Dec. 22, 1942

2,305,858

UNITED STATES PATENT OFFICE 2,305,858

SPEED CONTROLLING MECHANISM

Howard L. Fuston, Oak Park, Ill.

Application February 17, 1941, Serial No. 379,385

12 Claims. (Cl. 123—102)

This invention relates in general to a speed controlling mechanism for rotating or other moving parts and is more particularly described in connection with an internal combustion engine as used in automobiles.

An important object of the invention is in the provision of a speed responsive governor for electrically controlling the ignition and fuel supply of an engine.

A still further object of the invention is in the provision of speed and fuel control units which may be readily applied to existing automobile engines without any material change or variations in the structures thereof.

A further object of the invention is in the provision of a speed controlled electric switch which may be accurately adjusted to operate at any desired or predetermined time to open and close electric circuits.

A still further object of the invention is in the provision of electrically operated means for controlling the fuel supply by means of a valve operated thereby.

Other objects of the invention will appear hereinafter and will be apparent from the accompanying drawings in which—

Fig. 1 is a side elevation of an automobile engine to which the present invention is applied;

Fig. 2 is a wiring diagram illustrative of the invention;

Fig. 3 is a sectional view of a speed controlling governor switch;

Fig. 4 is a sectional view taken on the line 4—4 of Fig. 3;

Fig. 5 is a section taken on the line 5—5 of Fig. 1 showing the fuel control mechanism; and Fig. 6 is a sectional view taken on the line 6—6 of Fig. 5.

In many types of power mechanism, it is desirable to limit or control the speed of some moving part to protect the machine itself from racing, to comply with speed-laws and the requirements, and in general to prevent the mechanism from being operated beyond a predetermined speed. This type of control is particularly adapted, for example, to the operation of trucks, taxicabs and other motor vehicles which are restricted against fast driving, and although the present invention is particularly described in connection with an automobile engine, a similar speed controlling installation may be applied to other engines or drivers, as for example, a belt driven dynamo or any mechanism driven by an engine which may tend to race or unduly speed up when a load is withdrawn therefrom.

Although the speed controlling means is herein described as electrically operated, it is apparent that the fuel controlling device might also be actuated by vacuum or air, or it may be moved entirely by mechanical means and controlled by a similar governor switch or by a governor mechanism in which the operating arm effects control of the air, vacuum, or mechanical fuel control means in a desirable manner for the purpose set forth.

In carrying out the present invention, a governor switch is set to open and close at a predetermined critical point, so that if it is desired to limit the speed of an automobile to forty-five miles per hour, the controlling mechanism will cut off the fuel supply and the ignition at that point, and no further acceleration is possible. As soon as the speed decreases to a point below the set amount, the governor switch automatically returns the fuel control mechanism and the ignition to full operation. Thus there is no decrease in efficiency or power, there is no loss in time, in setting or resetting the control parts, the full power of the engine and the full efficiency of the carburetor is maintained at all times that the engine is in operation. Furthermore, wear and tear on the engine and its driving mechanism is reduced, and in the case of motor vehicles, they are operated more safely within prescribed legal limits.

Referring now more particularly to the drawings, the invention is illustrated as applied to an automobile engine having a carburetor 10, and a fuel intake manifold 11, between which an electrically operated fuel controlled device 12, in accordance with this invention, is inserted. The engine or power-plant also comprises a power transmission located in a casing 13, and having a connection for the attachment of a speedometer 14 by means of its flexible cable and casing 15. A speed controlled governor switch 16 is usually interposed in the flexible speedometer drive, preferably at its point of connection to the transmission casing or near the indicator thereof, but it may be connected to any other suitable driving member which is more easily accessible, and accurately measures the speed of the engine or any other driver which is to be controlled.

The governor device comprises a casing 17, having opposite threaded stems 18 and 19 for its attachment to the transmission casing 13, and to the end of the speedometer drive respectively, and within the casing is a section 20 of a rotatable shaft, which is connected with the speedometer drive shaft in any well known manner.

Mounted for longitudinal movement on the shaft 20 is a sleeve 21, having a conical portion 22 at one end, and a recess 23 along the shaft at this end for seating a spring 24 therein, the other end of the spring extending against a thick projection 24, and tending to press the sleeve member against a cam 25 at the hub of a rotatable governor device pivoted centrally on the shaft 20 by a bearing pin 27.

A micro-switch mechanism 28 is also mounted in the casing 17, and comprises an outer flat contact spring 29 attached at one end by a fastening screw 30, and making engagement with a contact pin 31. Mounted adjacent the micro-switch is an operating lever 32 mounted intermediate its ends upon a pivot 33, and having a contact block 34 at one end to engage the conical surface 22. At the other end, a set screw 35 extends through the arm to engage the spring 29 and is locked in any adjusted position for contact therewith by a lock nut 36. The portion of this construction is that as the governor 26 is thrown outwardly by the rotation of the shaft 20, it moves the sleeve 21 outwardly therefrom, that is, compressing the spring 24 so that the contact block 34 rides up on the conical surface 22. When the speed reaches a predetermined maximum, the operating arm 32 is moved to engage the contact screw 35 with the spring 29, operably engaging the switch projection 31 for opening and closing the circuits of the micro-switch 28.

Three conductors 37, 38 and 39 are shown extending from the micro-switch 28 which are represented in the diagram of Fig. 2 as leading respectively to a battery 40 through a control switch 41, to the primary winding 42 of an ignition coil and to a winding 43 of a solenoid or other electro-responsive device for the fuel controlled mechanism 12. In the diagram, the micro-switch member 31 is represented as pressed by a spring 29 either to make contact with a switch point for the conductor 38 or for the other conductor 39.

In ordinary operation, a circuit is closed from the battery through the conductor 37, and the micro-switch to the conductor 38, and the high tension winding 42 of the transformer 44, for an ignition distributor 45. When the speed of the driving member reaches a predetermined maximum, the switch 28 is operated to open the ignition circuit, and to close a circuit from the battery from the conductor 29, to the winding 43 of the fuel of an auxiliary fuel controlling device 12, as shown more clearly in Figs. 5 and 6. This device comprises a valve plate 46, slidably mounted and enclosed between the outer plates 47 and 48, having registering perforations 49 and 50 communicating with interior openings of the carbureter 10 and fuel manifold 11 respectively. The outer plates 47 and 48 together with the enclosed valve sliding plate 46 are relatively thin, so that they may be inserted without other change between the adjacent connected parts of a carbureter and its intake manifold, the outer edges between the plates 47 and 48 being connected by a filler 51, and attached by fastening device 52, so that they may be inserted as a unit and fastened between the carbureter and manifold parts by fastening bolts 53.

As shown in Fig. 5, there are two registering openings through the plates, and the valve plate 46 is therefore formed with two rounded projections 54 separated by a slot 55, by which it is guided on a central partition 56 between the openings. For a carbureter installation which has but a single opening, the valve and the outer cover plates therefor would be modified accordingly.

To operate the valve to and from closing position, a follower 57 is attached to the inner end of the valve, and has a projection 58 to engage in a spiral groove 59 of a member 60 formed integral with or mounted on an operating shaft 61 extending parallel with the valve plate 46, and into an adjacent housing 62, which supports a solenoid 63, having a movable core 64 mounted on a shaft 65, for movement into and out of the solenoid. In one side of the core is a rack 66, engaging a pinion 67 secured to shaft 61, so that as the core 64 is moved by the solenoid winding, a shaft 61 is rotated, moving the valve 46 in accordance with the engagement of the follower with the spiral groove 59. In practice, the valve is moved positively outwardly to close the valve openings, when the solenoid is energized, and the valve and the core of the solenoid are returned to open position by a spring 68, which bears at one end against a collar 69 secured to the end of the shaft 65, and at the other end against an outer wall of the housing 62.

With this construction, the speed of the engine or of a member driven thereby is automatically limited, and prevented from racing beyond the predetermined speed; in an internal combustion engine the fuel is reduced or cut off, and the ignition circuit is broken. As soon as the speed of the driven member drops below the predetermined maximum, the centrifugally operated switch reverses the electrical connections, reestablishing the ignition circuit and breaking the circuit to the valve operating device which is returned by a spring, so that the engine will resume operation at a speed slightly less than the predetermined maximum, and may be continued at or near that speed without further reduction.

I claim:

1. The combination with a driving motor and a member driven thereby, of normal means for controlling the power supply to the motor, an auxiliary control for the power supply, speed responsive means comprising a conical member movably actuated by the driven member, and an operative connection between the speed responsive means and the auxiliary control comprising a lever moved by the conical member to actuate the auxiliary control to retard the motor when the speed of the driver reaches a predetermined limit.

2. The combination with a motor and a member driven thereby, of normal means for controlling the power supply to operate the motor, an auxiliary power supply cut-off, speed responsive means including a spring pressed conical member movably actuated by the driven member, and an operative connection between the speed responsive means and the cut-off including a lever engaging the conical member operative to insert the cut-off in the power supply when the driver reaches a predetermined speed and to withdraw the cut-off when the speed of the driver falls below the predetermined amount.

3. The combination with an internal combustion engine and a member driven thereby, of means for supplying fuel to the engine, an auxiliary valve in the fuel supply, a speed indicator for the driven member, a governor device comprising a rotatable and longitudinally movable conical device also actuated by the driven member, and a connection between the governor device and the said valve including a switch lever engaging the conical member and operable thereby for closing the valve when the driven member attains a predetermined speed as shown by the indicator, and opening the valve when the speed falls below the predetermined speed.

4. The combination with an internal combustion engine having fuel supply and ignition circuit means, and a member driven thereby; of an auxiliary valve in the fuel supply, a governor device actuated by the driven member comprising a spring pressed rotatable and longitudinally movable conical device, and connecting means from the governor device including a lever engaging the conical device and a switch operated by the lever for closing the valve and opening the ignition circuit when the member is driven at a predetermined speed and for opening the valve and closing the circuit when the member is below the predetermined speed.

5. A speed controlling governor for an internal combustion engine having a driven member, fuel supply means, and an ignition circuit, the governor comprising a switch closing device actuated by the driven member comprising a rotatable and longitudinally movable conical member, a lever engaging the conical surface at one end, and an electrical switch operated by the lever at its other end, a valve in the fuel supply, and a connection from the device to close the valve and open the ignition circuit when a predetermined speed of the driven member is reached, and to open the valve and close the ignition circuit when the speed of the driven member falls below the predetermined amount.

6. A speed controlling governor for an internal combustion engine having a driven member, fuel supply means, and an ignition circuit, the governor comprising an electrical switch device having an operating lever and a rotatable and longitudinally movable sleeve with a conical surface engaged by the lever and actuated by the driven member at a predetermined speed, a valve for the fuel supply actuated by electro-responsive means, and circuit connections from said device to the valve means and for the ignition circuit, the device being operative to close the circuit for the valve means and to open the ignition circuit when the speed of the driven member reaches a predetermined maximum and to reverse the connection when the speed falls below that amount.

7. In a speed governor for an internal combustion engine having a driven member, fuel supply means, and an ignition circuit, the governor comprising a switch, a centrifugal member operated by the driven member, a switch operating lever, a conical contact sleeve rotatably and longitudinally moved by the centrifugal member to engage and actuate the lever for operating the switch at a predetermined speed, a valve for controlling the fuel supply having an electrical operating device, and circuit connections controlled by the switch to close a circuit to said device for closing the valve and for opening the ignition circuit when the speed of the driven member reaches a predetermined amount, and to open the circuit to the device and close the ignition circut when the speed is below the predetermined amount.

8. In a speed governor according to claim 7, an adjustment for varying the actuating point of the switch, the switch lever having a contact screw extending through the end opposite the conical contact for engaging and actuating the switch, means for locking the screw in adjusted position, and a spring contact blade engaged by the end of the screw for maintaining engagement of the conical contact portion of the sleeve with the lever through said screw.

9. In a speed governor for an internal combustion engine having a driven member and a fuel supply passage, a centrifugal switch having an actuating lever and a rotatable and longitudinally movable spring pressed sleeve with a conical surface engaged by the lever and operated by the driven member, an auxiliary valve member for the fuel passage, an electro-responsive device for moving the valve to close the fuel passage, spring means to return the device and the valve to open position, and circuit closing means operated by the switch to open and close the said valve depending upon the speed of the driven member.

10. In a speed governor according to claim 9, a connection between the valve and its operating device comprising a reciprocable core returned by said spring means, a rotatable member having an outer spiral slot, a follower attached to the valve and limited to a reciprocating movement and engaged with the slot, and a rack and pinion connection between the core and said rotatable member to move the valve by the engagement of the follower and slot when the core is moved.

11. In a speed governor attachment for an internal combustion engine having a carbureter connection to a fuel manifold and connected between them without materially displacing either one, an auxiliary fuel control device comprising a slidable valve and a thin perforated holder therefor insertable directly between a carbureter and a fuel manifold therefor as an additional and independent engine controlling device, electrical means for closing the valve in the holder, means for opening the valve, and centrifugal switch means depending upon the speed of the engine comprising a rotatable and longitudinally movable conical member, a lever engaging the conical surface at one end, and an electrical switch operated by the lever at its other end for closing a circuit to said electrical means to close the valve.

12. A speed governor attachment for an internal combustion engine having a carbureter connection to a fuel manifold and ignition means for the engine; said attachment comprising an auxiliary fuel controlling device with a slidable valve and a thin perforated holder therefor insertable between and without displacing the carbureter and fuel manifold of an engine as an additional independent controlling device therefor, electrical means for closing the valve in the holder, means for opening the valve, and centrifugal switch means depending upon the speed of the engine comprising a rotatable and longitudinally movable conical member, a lever engaging the conical surface at one end, and an electrical switch operated by the lever at its other end, for closing a circuit to said electrical valve closing means and to open a circuit to the said ignition means.

HOWARD L. FUSTON.